March 1, 1932. A. DINA 1,847,642
HEAT RESISTANT SHUTTER FOR MOTION PICTURE PROJECTION MACHINES
Filed June 29, 1929 2 Sheets-Sheet 1

INVENTOR
Augusto Dina
BY
Howard W. Dix
his ATTORNEY

March 1, 1932.  A. DINA  1,847,642
HEAT RESISTANT SHUTTER FOR MOTION PICTURE PROJECTION MACHINES
Filed June 29, 1929   2 Sheets-Sheet 2

INVENTOR
Augusto Dina
BY
Howard W. Dix
his ATTORNEY

Patented Mar. 1, 1932

1,847,642

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

HEAT RESISTANT SHUTTER FOR MOTION PICTURE PROJECTION MACHINES

Application filed June 29, 1929. Serial No. 374,737.

This invention relates to motion picture apparatus and particularly to motion picture projectors with especial reference to a new and improved shutter adapted for efficient use with the modern standard projectors employing high power arcs and other illuminants which create much greater amounts of heat than formerly occurred.

A main object of the invention is to provide a simple, efficient, durable, and compact shutter which may be used on a projector especially between the projection head and the lamp house without being detrimentally affected by the high heat there encountered and at the same time operating in a manner to most efficiently utilize the light thrown upon the film.

Further and more specific objects, features, and advantages will more clearly appear from the detailed description given below when taken in connection with the accompanying drawings which form part of the specification and which illustrate one preferred embodiment of the invention.

Generally speaking the invention concerns the disposition in the projection beam between the lamp house and the projection head, of a multi-bladed shutter the blades of which are preferably bent at an angle to the axis of rotation to create a fan action and ventilate the head and the film and with suitably bent leading and trailing edges, preferably combed, so that the blades may be disposed as closely as possible to the film aperture in the beam which is of necessity tapering at this point. The blades, being disposed in a very hot portion of the beam, are covered with a suitable material, such as an enamel, which is especially resistant to the heat, and will thus permit the use of shutters of metal, when so covered, which metal alone could not otherwise operate except for very short periods of time without the need of renewal. It has been proven by repeated tests that when metal, especially steel, shutters are disposed in the beam between the lamp house and the film, they soon become warped and bent and are unfit for further use and must be replaced. Aluminum blades are preferred, due mostly to the characteristics of light weight, but it has been found that they will not withstand the intense heat of the projection lights. It has been found that when the blades are covered with a coating of enamel, especially high heat resistant enamel, that they will operate substantially indefinitely without being marred, twisted, burnt, or otherwise injured. Thus the problem has been solved which permits the shutters to be used in the most advantageous place from the standpoint of the most efficient use of the light, but at a point which has previously been a most disadvantageous one from the standpoint of the effect on the shutter structure of the heat to which it is subjected.

The drawings illustrate the present preferred form of the invention, and in them, Fig. 1 is a general side view of the lamp house and the head of the projection machine showing the relation between them and the shutter disposed therebetween;

Figure 1:
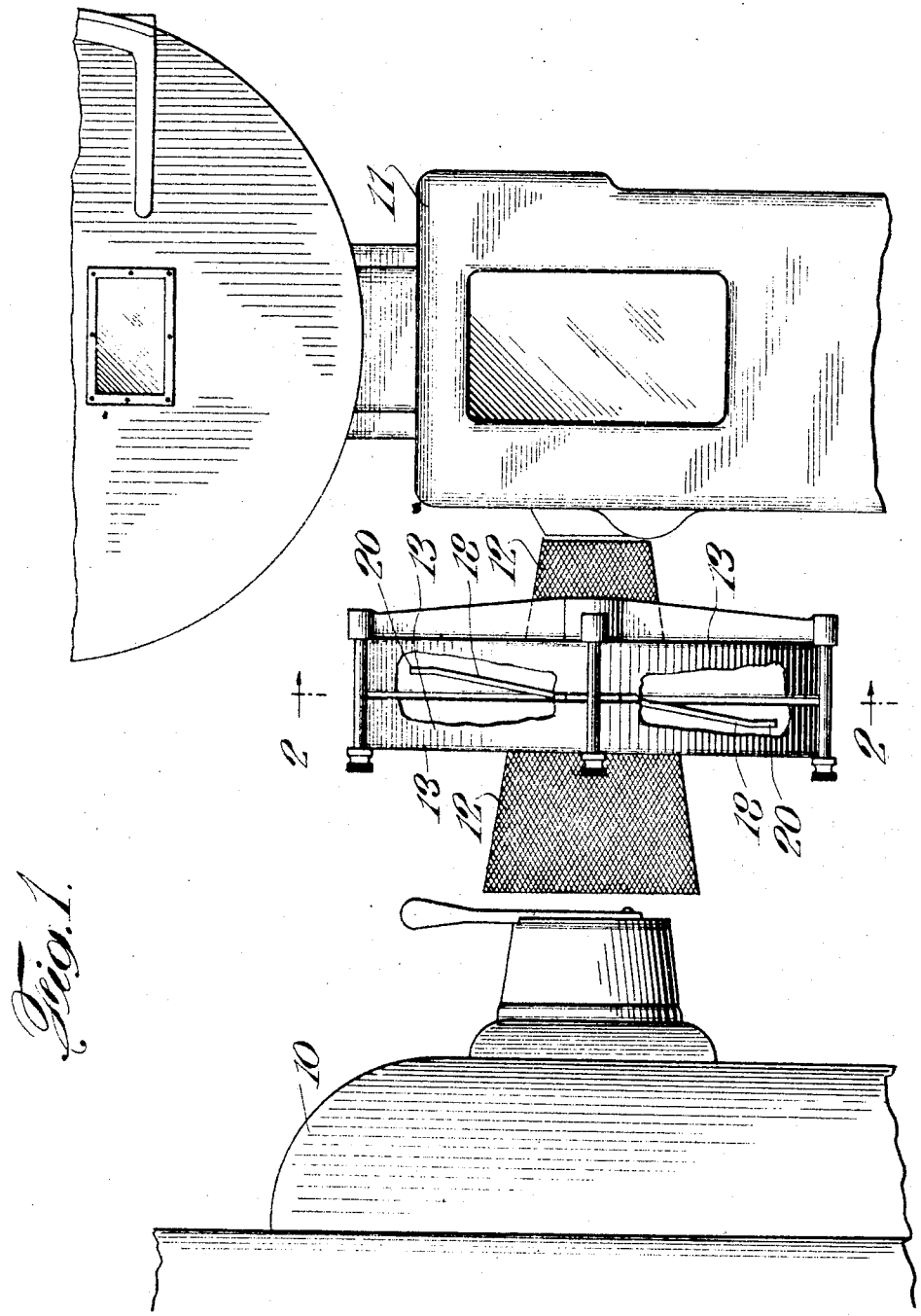

In the preferred form shown in the drawings, with reference to Fig. 1, it will be seen that the projector comprises a lamp house 10, a projection head 11 with intermediate light shields 12 and a shutter guard casing 13 which latter two elements are supported preferably from the head 11. It is thus easily appreciated how near the shutter, as shown mounted within the casing 13, is to the source of the projection light and consequently, in view of the high power arcs now employed, it is obvious how essential it is that the shutter blades be so constituted that they will not deteriorate under the high heat. The shutter is disposed in this location however because in back of the head the high speed rotation of the shutter tends to reduce flickering and the angular relation of the blades to the axis of rotation will act fan-like and ventilate the head and the film to keep them cool.

Figure 2:
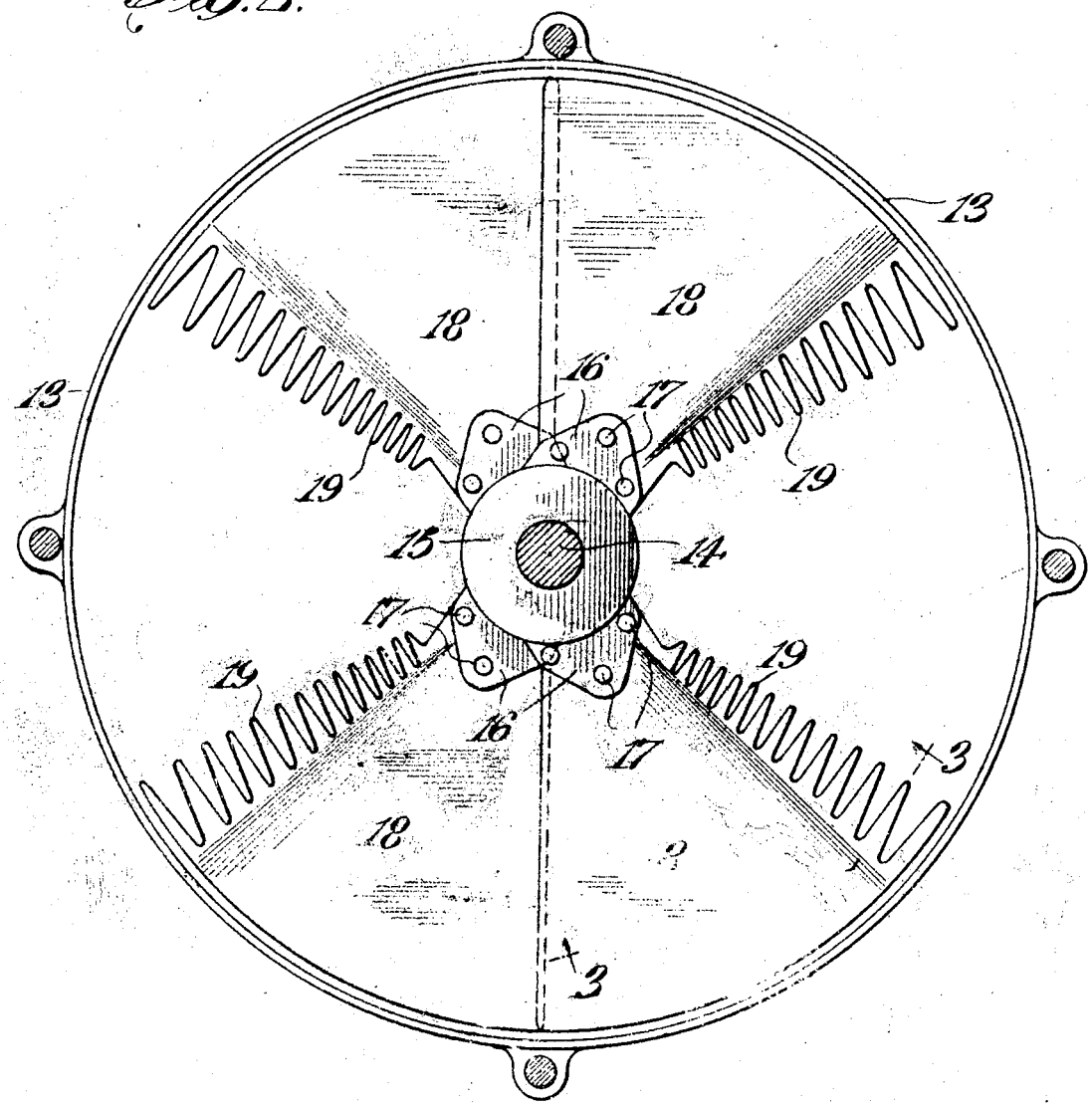
Fig. 2 is a vertical section taken on the line 2—2 of Fig. 1.
Figure 3:
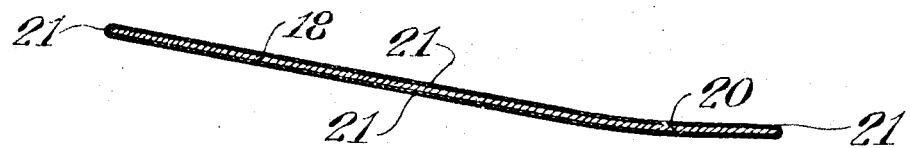
Fig. 3 is a cross section taken through one of the blades on the line 3—3 of Fig. 2.

As shown in Fig. 2, within the guard casing plates 13 is disposed the shutter shaft 14 carrying hub 15 from which project a plurality of spaced ears 16 having apertures to receive screws, bolts, or rivets, 17 utilized to engage apertures in the blades such as 18. It will be noticed that the blades are arranged in sets of two which in sets overlap along their adjacent edges and are disposed at an angle to the axis of rotation to produce the fan action above described. Preferably the two blades have their leading as well as their trailing edges combed as shown at 19. This combing reduces flickering and is described in my co-pending application Serial Number 322,699, filed November 30, 1928, entitled Projection machine shutter (comb) for motion picture projection machines eventuating into Patent No. 1,802,709. It will also be noticed that the combed edges are bent as at 20 from the general plane of the blade and more parallel to the axis of rotation which permits the shutter as a whole to be rotated in a plane nearer to the film while at the same time allowing the fan action to take place, this construction being more fully described in my co-pending application Serial Number 351,585, filed April 1, 1929, entitled Improved shutter for projection machines (bent edges) eventuating into Patent No. 1,765,006. It is to be understood that the blades may be of the straight flat type and may not even be combed at their edges. In Fig. 3 it will be observed that each wing of the shutter is covered with a substantial layer of a coating such as enamel 21. This enamel is of a sort which is capable of being baked on firmly and is of a quality which resists the very high heats which are found so near to the modern projection arcs and lamps. The blades are preferably made of steel but of course other metals are adaptable and can be employed such as aluminum.

Thus according to this invention, a shutter is disposed near the arc and between it and the film and is not detrimentally affected by the high heat because of the particular protective covering; the shutter is angular disposed to cool the head and the film; combed to reduce flickering so that it may be run at lower speeds than usual; and its edges are bent so that it may be disposed nearer the film aperture and in a smaller diameter of the beam of projection light which results in a more efficient utilization of the light as explained in the above mentioned applications.

While the invention has been described in detail and with respect to a preferred form thereof, it is not desired to limit it to such details and forms since many changes and modifications may be made and the invention embodied in other forms without departing from the spirit and scope of the invention in its broader aspects. Hence it is desired to cover all forms and modifications coming within the language or scope of any one or more of the appended claims.

What is claimed, is:

1. In a motion picture projector, a shutter disposed between the film and the source of the projection light, said shutter being of metal with a high heat resistant covering, the blades of the shutter being disposed at an angle to a plane normal to the axis of rotation to produce a fan action and ventilate the film and the head, the leading and trailing edges of each blade being combed to reduce flickering, said edges also being bent into the plane of rotation to permit the shutter to be disposed near the film.

2. In a motion picture projector, a shutter, disposed between the film and the source of the projection light, said shutter being of metal with a high heat resistant covering, the blades of the shutter being disposed at an angle to a plane normal to the axis of rotation to produce a fan action and ventilate the film and the head, each blade comprising a pair of spaced elements having their adjacent edges overlapping, the leading and trailing edges of each blade being combed to reduce flickering, said edges also being bent into the plane of rotation to permit the shutter to be disposed nearer the film.

AUGUSTO DINA.